S. F. BAUWENS.
MACHINE FOR USE IN MAKING WIREBOUND BOXES.
APPLICATION FILED MAR. 22, 1919.

1,437,386.

Patented Nov. 28, 1922.
6 SHEETS—SHEET 1.

Inventor:
Seraphine F. Bauwens
By Emery Booth Janney & Varney
Atty's

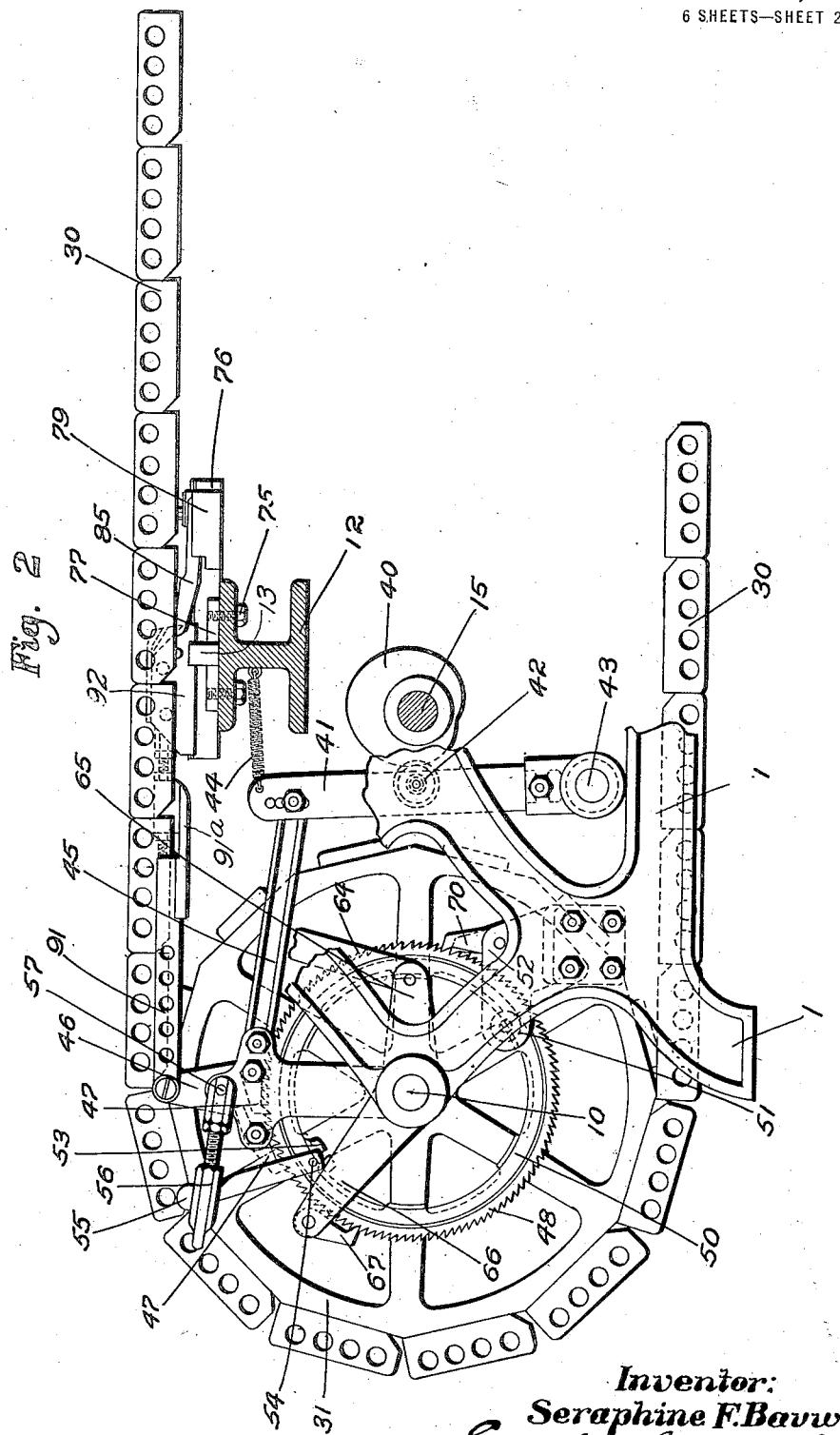

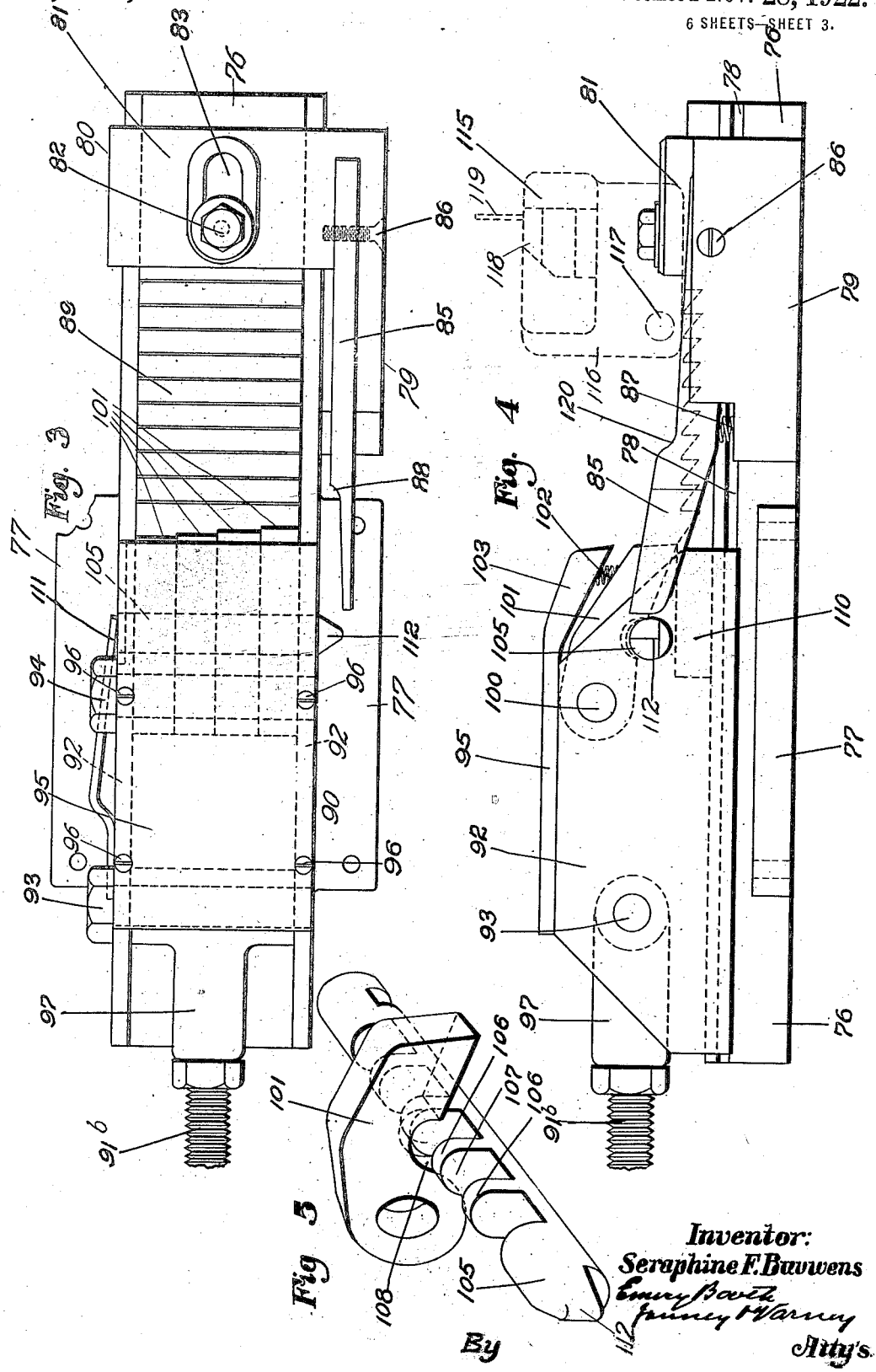

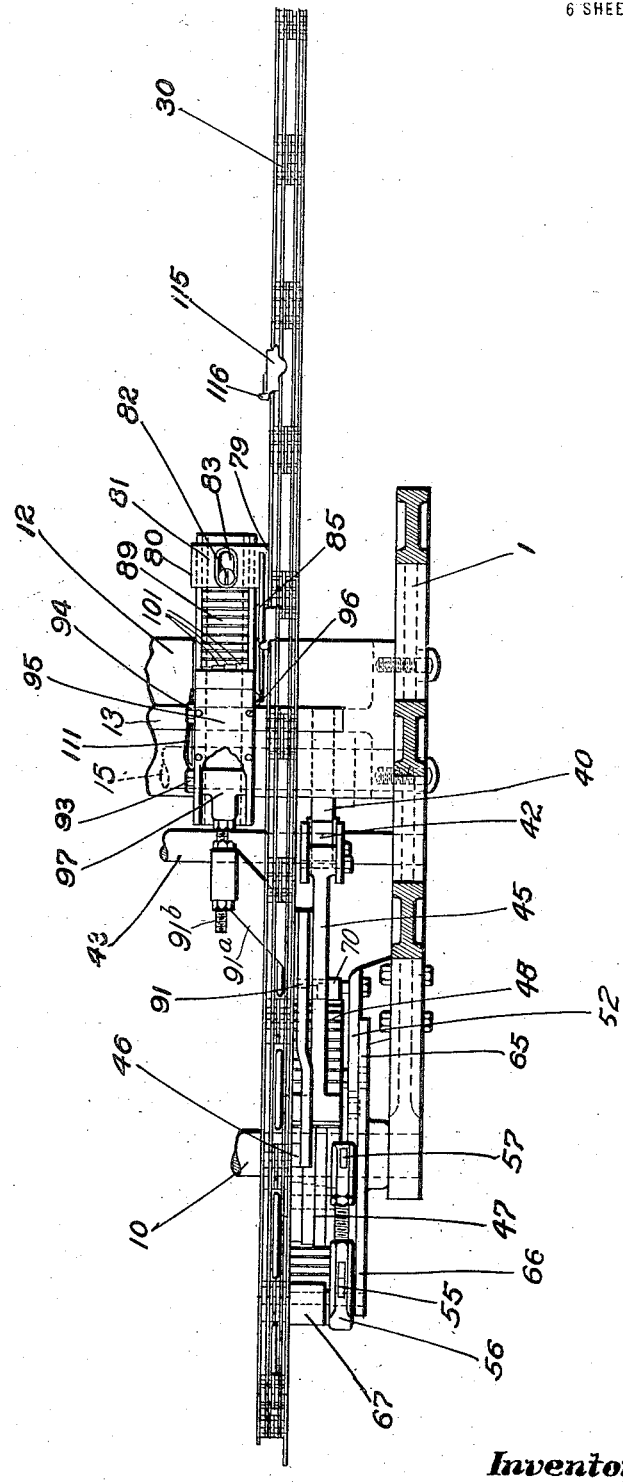

S. F. BAUWENS.
MACHINE FOR USE IN MAKING WIREBOUND BOXES.
APPLICATION FILED MAR. 22, 1919.
1,437,386.
Patented Nov. 28, 1922.
6 SHEETS—SHEET 5.
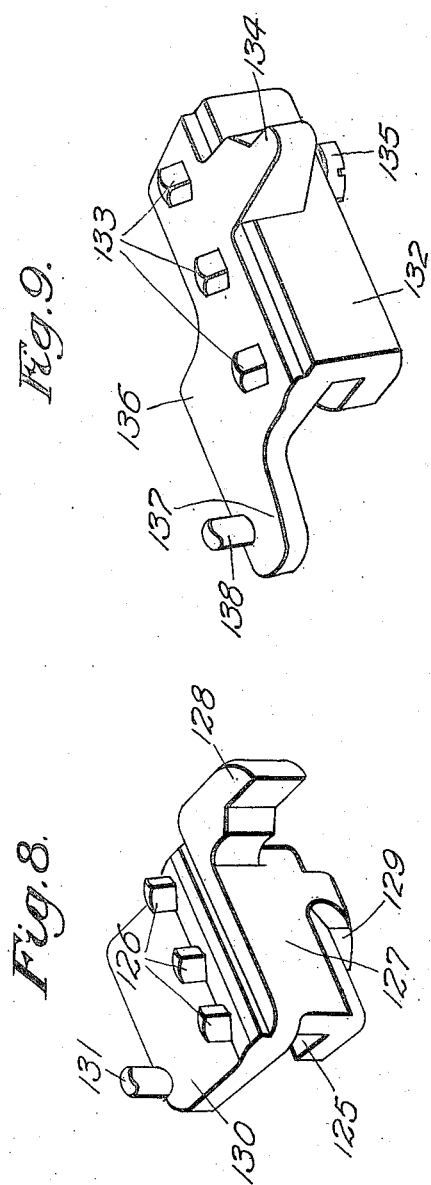
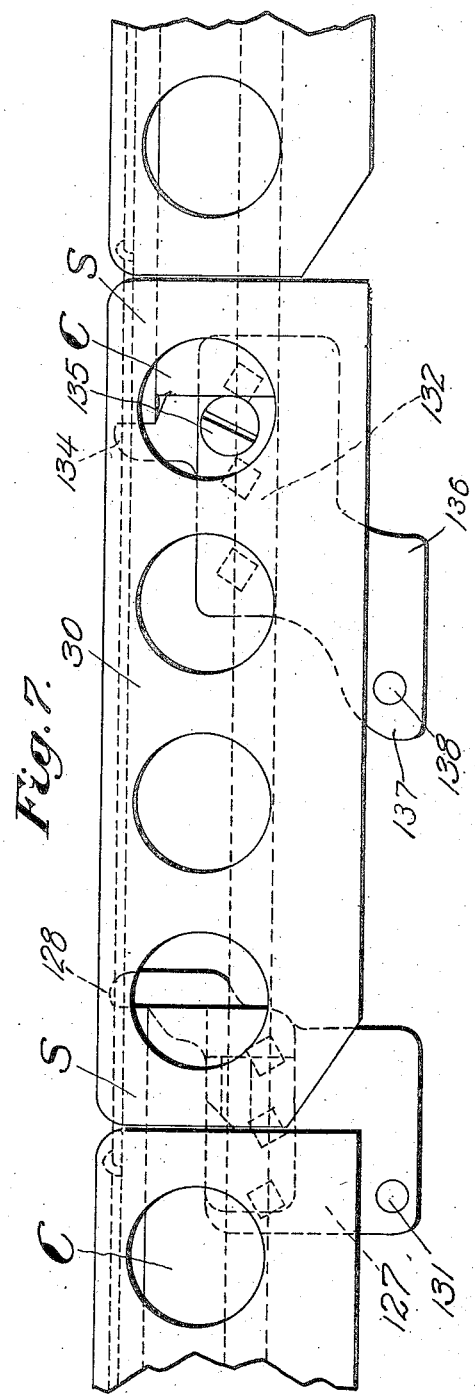
Inventor:
Seraphine F. Bauwens
By Emery, Booth, Janney & Varney
Attys.

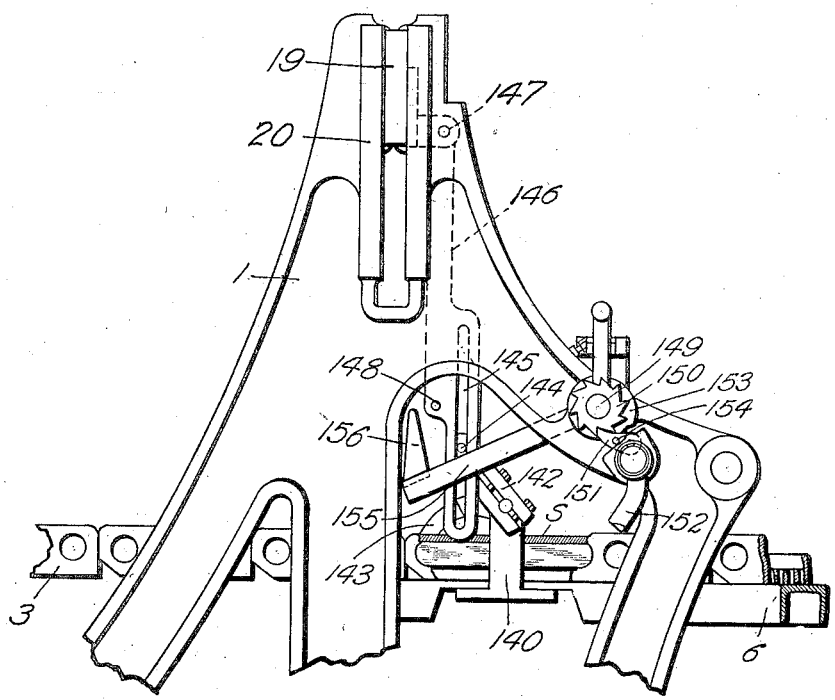

Patented Nov. 28, 1922.

1,437,386

UNITED STATES PATENT OFFICE.

SERAPHINE F. BAUWENS, OF CHICAGO, ILLINOIS, ASSIGNOR TO WIREBOUNDS PATENTS COMPANY, OF KITTERY, MAINE, A CORPORATION.

MACHINE FOR USE IN MAKING WIREBOUND BOXES.

Application filed March 22, 1919. Serial No. 284,332.

*To all whom it may concern:*

Be it known that I, SERAPHINE F. BAUWENS, a citizen of the United States, residing in Chicago, in the county of Cook, State of Illinois, have invented an Improvement in Machines for Use in Making Wirebound Boxes, of which the following is a specification.

My invention relates to machines for use in making wirebound boxes or box blanks, and particularly to mechanism for controlling the disposition of the fasteners by which the binding wires are secured to the box materials and the latter connected together.

Among other objects the invention is intended to provide efficient means for definitely locating such fasteners, particularly with reference to the forward and rear edges of the box sections; and for accomplishing certain ancillary functions, including adjustment of the spacing of the fasteners appropriately to the widths of the box sections, and skipping the fastener-setting operation in the intervals between materials for successive boxes or blanks.

In the accompanying drawings, I have shown for illustration an embodiment of my invention in a typical wirebound box blank machine, having provision for receiving assembled cleats and sheets of side material for successive box sections, introducing continuous binding wires and progressively applying staples to fasten the wires to the sections and secure the cleats and sheets thereof together, thus forming foldable box blanks each composed of a number of wire-connected cleated sections, such blanks being successively produced in a continuous run of the machine.

Referring to the drawings—

Fig. 2 is a sectional elevation of the delivery end of the machine with parts omitted.

Fig. 3 is a detail plan view of a pawl and rack mechanism which functions in the placing of fasteners.

Fig. 4 is a side view of Fig. 3, showing in dotted lines one of the spacer blocks of the work conveyer functioning to control said mechanism.

Fig. 5 is a detail perspective view of certain elements of the mechanism of Figs. 3 and 4.

Fig. 6 is a sectional plan view of a portion of the machine.

Fig. 7 is a detail side view of a portion of the work conveyer, showing the spacer blocks between the materials for successive box blanks.

Figs. 8 and 9 are inverted perspective views of said spaced blocks.

Fig. 10 is a side elevation of a portion of the machine, showing means to effect skipping of the fastener-setting operation.

Figure 1:
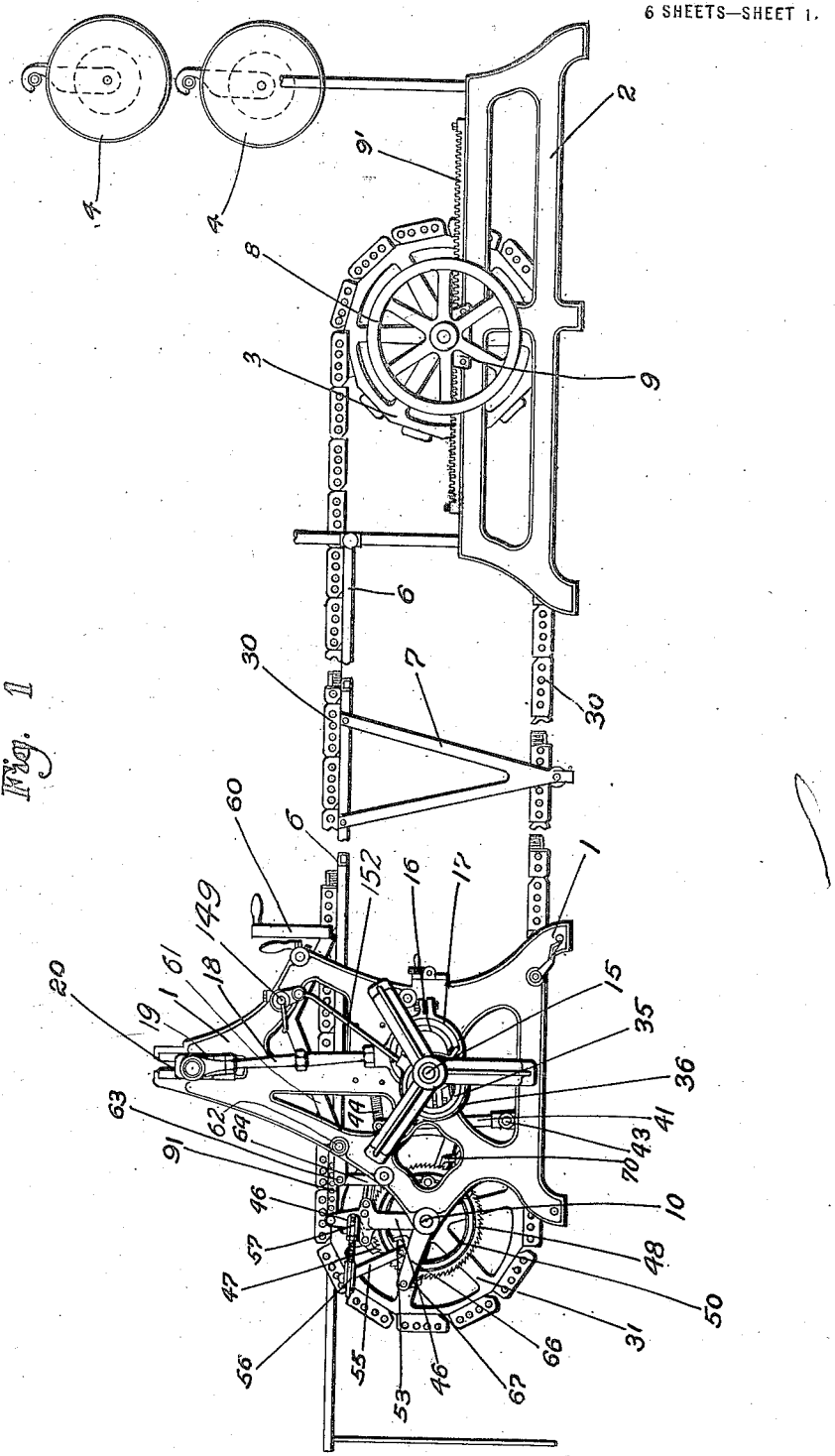
Fig. 1 is a side elevation of the illustrative machine.

The illustrative machine comprises a work conveyer 30, upon which box sections, comprising pairs of cleats with sheets of side material laid thereon, are successively assembled to provide a box blank or successive blanks. The conveyer is constituted by a pair of endless chains, the links of which are channel-shaped to receive the cleats of the box sections. Suitable spacer blocks, hereinafter referred to, are provided on the chains for properly spacing and positioning adjacent sections and successive blanks. The conveyer chains are trained around sprocket wheels 3 and 31, mounted in the frames 1 and 2, and between the sprockets run on the usual supporting rails 6. Their lower runs are supported by rollers from hangers 7. The sprockets 31 are drivers and the sprockets 3 idlers, the latter being mounted in bearings 9 adjustable along rack 9', such adjustment being controlled by hand wheel 8, for adapting the chains to the manufacture of box blanks of different lengths.

The conveyer is advanced, preferably step-by-step, for progressively submitting the assembled work to the operation of a gang of stapling mechanisms to secure continuous binding wires to the box sections, such wires being supplied from the reels 4 and introduced upon and pulled along with the work as it progresses beneath the staplers in a manner well understood in the art. Binding wires alined with the cleats are stapled through the sheets thereto, thus securing the cleats and sheets together as well as the wires thereto, and intermediate binding wires are stapled to the sheets alone and clinched on their under sides by coaction of the staplers with suitable anvils, not shown, supported on the rib 13 of a cross-member 12 connecting the side frames 1.

The staplers, not specifically shown, may be of any known or approved character, preferably adapted at each operation to cut and form staples from staple wire stock and to drive the same into the work. Suitable staplers of this type are illustrated for example in the patent to Thompson, No. 1,258,625, March 5, 1918. The staplers are operated by the vertically-reciprocating cross-head 19, working in guides 20 of the frames 1, said cross-head being operated by pitman 18 from eccentric strap 17 of eccentric 16 on the main drive shaft 15; there being similar operating connections at either side of the machine. The mechanism for feeding the staple stock wire is also actuated from the main shaft 15 by eccentric 35, eccentric strap 36, and connecting rod 152.

It will be understood that the upward or inoperative stroke of the stapler-operating cross-head 19 occurs during the relative movement of the work, while the downward staple-driving stroke occurs during the period of rest. The extent of intermittent movement of the work determines the space between adjacent staples.

For advancing the work step-by-step, the driving sprockets 31 of the conveyer are intermittently rotated by a ratchet feed mechanism, driven from the main shaft 15 as shown in Fig. 2. On the main shaft is a cam 40 co-operating with a cam-following lever 41 equipped with roller 42 and held toward the cam by a spring 44, said lever being pivoted on the shaft 43. Lever 41 is connected by the link 45 with a pawl-carrying arm 46 rockingly mounted upon the sprocket shaft 10. Said arm 46 carries a set of spring-pressed pawls 47 for engagement with a ratchet wheel 48 fast on the sprocket shaft. At every operation of the arm 46 from the cam 40, at least one of these pawls 47 will engage and turn the ratchet wheel and thus advance the conveyer.

Associated with this feed mechanism is a brake to prevent overrunning of the conveyer. It comprises, within a circular flange on the ratchet wheel, a divided brake-shell 50 the sections of which are pivoted together at 51 on a bracket 52, and are provided opposite said pivot with lugs 53 adapted to be spread apart to expand the shell. Between these lugs is an oval element, not shown, attached by pin 54 to an arm 55, the latter connected by an adjustable link 56 pivoted at 57 to the arm 46. Upon operative movement of the pawl-carrying arm 46 the said oval element is turned between lugs 53 to spread the brake-shell, instantly stopping the travel of the conveyer at the end of the feed stroke. Backward movement during the return or inoperative stroke of the arm 46 is prevented by retaining pawls 70.

To permit the operater to advance or shift the work independently of the feed mechanism, for adjusting purposes or to arbitrarily vary the placing of staples at will, there is provided a hand lever 60 (Fig. 1) forming an extension of a lever arm 61 which is fulcrumed at 62 to the machine frame and connected at 63 by the link 64 to one arm 65 of a bell crank lever rockingly mounted on the sprocket shaft, the other arm 66 thereof carrying a gravity pawl 67 in engagement with the ratchet 48. By this manually operated means the ratchet wheel can be turned independently of the feed mechanism to advance or shift the work to any desired extent.

Automatic regulation of the feed, for placing the staples as desired on the box blank, is accomplished by means presently to be described, having provision for determining normal step movements of the conveyer to space the staples at regular or uniform intervals, and provision for effecting arbitrary feed steps for definitely positioning particular staples in desired relation to the work. Any of the staples may be thus definitely positioned, though it will be understood that if certain selected staples, for instance those adjacent the forward and rear edges of the box sections, be correctly located the others will be satisfactorily placed by spacing them at proper intervals. The position of these edgemost staples is especially important, as they should be placed away from the edges of the sections at such points as to avoid interference with the proper interengagement of the cleats, and also to secure the binding wires and the cleats and sheets together at the most effective distances from the box corners for contributing to the strength and efficiency of the box. Therefore in the illustrative machine the controlling mechanism is arranged for definitely positioning the first and last staples of each blank, and the last staples of the individual box sections, leaving the remainder to be cared for by appropriate adjustment of the normal feed.

Referring to Fig. 2, it will be obvious that the length of each step movement of the conveyer will be determined by the backward reach of the pawls 47, that is to say, if these pawls are permitted to draw back over the ratchet 48 to the full extent permitted by the actuating cam 40, then a full maximum feed step will be produced, but if interrupted in their backward reach a shorter feed step will result. Thus the effective operation of the ratchet-driving arm 46 may be regulated or variably determined by limiting its backward stroke under impulse of the spring 44, causing lost motion between the actuating cam 40 and the lever 41 before the working stroke begins; and by this regulation determined step movements may be imparted to the conveyer to present the work successively to receive staples at prescribed places or at prescribed intervals apart.

The controlling mechanism for these functions is as follows:

For limiting the stroke of the ratchet-driving arm 46, said arm is connected by the rod 91, and connections 91$^a$, 91$^b$ and 97, with a reciprocating pawl carrier 90 (Figs. 3 and 4) having a set of pawls 101 adapted to controllably coact with the teeth 89 of a stationary ratchet plate 76, the latter secured by bolts 75 through flange 77 to the cross frame member 12. The extent of backward movement of said carrier, as determined by engagement of one or more of said pawls 101 with said teeth, determines the inoperative stroke of the ratchet driving arm 46, and thus controls the distance the work conveyer will be advanced at every cycle of the machine. The pawl-carrier 90 comprises side plates 92 connected by bolts 93 and 94 and top plate 95 secured by screws 96, said side plates 92 embracing the ratchet plate 76 and having fins slidably engaging in longitudinal grooves 78 thereof. Bolt 93 provides a pivot for the head 97 of the connecting rod 91. The pawls 101, pivoted in said carrier at 100, and engaged by springs 102 under an extension 103 of the top plate 95, are normally upheld from the teeth of the ratchet plate by a trigger 105 arranged cross-wise under the pawls. Said trigger, shown in detail in Fig. 5, has full and cut-away portions 106 and 107, the full portions 106 being normally under the cutaway portions 108 of the pawls and thereby holding the latter clear of the ratchet plate. The trigger is maintained in this position by the spring 111, but is adapted to be shifted endwise to bring the recesses 107 under the pawls, allowing them to drop into engagement with the ratchet plate and thus stop the inoperative stroke of the ratchet-driving arm 46.

In determining normal feed movement of the conveyer, the shifting of the trigger 105 to drop the pawls 101 is controlled by a lever 85 having a cam surface 88 against which the beveled nose 112 of the trigger engages as the pawl-carrier moves backward with the inoperative stroke of the ratchet-driving arm 46, or toward the right. Upon the ensuing forward stroke, or movement, of the arm and pawl-carrier toward the left, the pawls 101 will be raised clear of the trigger by a raised surface 110 on the ratchet plate, allowing the trigger to snap back to its normal pawl-elevating position. In this way the normal feed is determined by the period of releasing of the pawls by the trigger, depending upon the relation of the trigger to the cam 88 of lever 85. Said lever is connected to a block 81 adjustably secured on the ratchet plate 76, said block having sides 79 and 80 embracing said plate and provided with fins slidably engaging the grooves 78 thereof. The block is secured in adjusted position by the bolt 82 passing through slot 83. The purpose of this adjustment of the block is to shift the lever, so as to change the relation of the cam 88 to the trigger 105, to enable the length of the normal feed step to be varied as desired, whereby normal spacing of the staples may be varied appropriately to the widths of the box sections. The lever 85, which is adapted to be occassionally displaced for a purpose hereinafter appearing, works in a slot in the block 81 to which it is pivoted at 86, and is normally supported in position for coaction with the trigger 105 by a spring 87.

For definitely positioning staples, the control of the ratchet feed through the stop mechanism, normally exercised by the cam 88 of lever 85, is occasionally assumed by members so related to the work as to be successively presented as feed controls at the proper times and in such relation to the feed mechanism as to cause step movements which will bring the work to position to receive staples at desired places. The controlling members referred to may be arranged along the work or connected with the conveyer, or other means moving therewith, to which is thus delegated the capacity to supercede the normal feed control whenever a staple is to be arbitrarily placed. For convenience, the spacer blocks which determine the relation of the box sections and successive blanks on the conveyer chains may be utilized as the controlling members or to carry the same. Provision may be made for adjustably securing the controlling members to the spacer blocks, which latter are adjustably secured on the conveyer chains.

One of the intermediate spacer blocks, that is a block used between sections of a blank, is shown in dotted lines in Fig. 4. Said block, designated 115, is secured in a well known manner on the side of one of the chain links, and is provided with the usual bevel-faced portion 118 to push or engage behind the mitered end of a cleat, and with the upstanding fin 119 which projects between adjacent box sections and engages behind the sheet of the section preceding it. Said block is further provided with a depending portion 116 which carries a pin 117. Whenever in the operation of the machine the travel of the conveyer brings the block 115 alongside the stop mechanism, its depending portion 116 will contact with the cam incline 120 on lever 85, depressing said lever and thus removing the cam 88 from the path of reciprocation of the nose 112 of the trigger 105. By this displacement or incapacitation of the normal feed control means, the pawl carrier or slide 90 and pawls 101 are free, so far as the lever 85 is concerned, to travel backward to the full extent of the possible maximum stroke of the ratchet driving arm 46. The pin 117 however assumes control, and operates the trigger 105 as the latter on backward movement of the slide 90 comes abreast of said pin, thus permitting the pawls 101 to drop into engagement with the ratchet teeth 89 and stopping the backward stroke of the ratchet driving arm 46. The consequent working stroke of said arm will therefore give an arbitrary feed step which may or may not happen to be of the same length as the normal feed step would have been if it had not beeen interfered with, but which at any rate will definitely position one staple in the blank at a predetermined point with respect to the block 115. The staple thus placed will be in correct relative position to the end of the cleat, sufficiently removed from the mortise or tenon portion or bevelled end thereof to avoid either weakening the cleat or interfering with the folding operation necessary to complete the wirebound box. During this movement the pin 117 has been carried past the trigger 105 but the depending portion 116 of the block 115 continues to depress the lever 85 so that neither the pin 117 nor the cam 88 of the lever 85 will affect the return movement of the pawl carrying slide 90. Consequently the next feed step of the machine will be a full maximum feed step which will carry the spacer block 115 and the space between sections accupied thereby beyond the stapling plane and will position the first staple in the next advancing section well clear of the forward end of its cleat. Thus it will be clear that if the pin 117 positions the last staple in a box section the positioning of the first staple of the succeeding section will accordingly be determined by said arbitrary feed step controlled by the pin 117 plus the following maximum feed step.

The blocks at the ends of the blanks, which control the positioning of the first and last staples in the blanks, are shown in detail in Figs. 8 and 9 and as connected to the conveyer chains in Fig. 7. Block 127 at the rear edge of the last section of the blank, which for brevity will be termed the rear block, has a groove 125 to fit over the side of the chain, and the block is connected to the chain by bolts 126, being adjustable along the chain and if necessary arranged to span the ends of two adjacent chain links by securing two of the bolts 126 to one chain link and leaving out the other bolt to permit flexibility in the chain. This block has a rear upstanding lug or fin 128 which pushes or engages behind the rear edge of the last sheet S in a blank, and a suitably bevelled boss 129 to push or engage behind the last cleat C in the blank. This rear block is further provided with a depending extension 130 from which projects a pin 131. The operation of the rear block is substantially similar to that of the intervening blocks 115, the pin 131 serving to position definitely the last staple in the blank in correct relative position to the rear edges of the last sheet and cleat in the blank.

The forward block 132 of the succeeding blank is spaced a suitable distance along the conveyer chain from the rear block of the preceding blank to provide the desired length of free wire between and connecting the blanks. This block is grooved like the other and likewise secured to the chain by bolts 133. It is provided with an upstanding lug or fin 134 rearwardly faced against the forward edge of the first sheet S in the blank, and is provided with a screw 135 against which abuts the forward edge of the first cleat C of said blank. By using screws 135 of different sizes, the relation between the forward edges of the first sheets and cleats in each blank may be arbitrarily determined. This forward block has a depending extension 136, a forwardly projecting portion 137 of which carries a pin 138. The operation of this block is substantially similar to those previously described, except for the fact that it causes a feed step which would, unless other means intervened, place a staple at a predetermined point forward of the first section of the blank. In other words, this forward block acts to cause an arbitrary feed step intermediate succeeding box blanks. Whether this arbitrary feed step will be the first one after the last staple has been driven in the preceding blank, depends upon the distance between these blocks on the chains. If spaced sufficiently far apart, one maximum feed step and one or more normal feed steps will have occurred intermediate the blanks prior to the time the pin 138 comes into operation upon the arm 85. Otherwise, the first feed step after the driving of the last staple in the preceding blank will be a maximum feed step and the succeeding step an arbitrary one. After this arbitrary feed step occasioned by the forward block, a maximum feed step occurs which will position the first staple in the succeeding blank in the desired relative position to the forward edge of that blank, that is to say, the forward block carries its pin 138 in such a position as to place a staple at a point just a maximum feed step ahead of the desired position of the first staple in the blank.

In other words, as material for a new box blank approaches the staplers, the feed step will be modified arbitrarily to operate the staplers at a point just a maximum feed step ahead of the desired position of the first staple to be driven in the new blank, whereupon the next maximum feed step will correctly locate that first staple.

From the foregoing description, it will be noted that for positioning staples I employ the principle of a pattern mechanism comprising controlling members correlated with relative positions of the work and stapling mechanism, adapted for successive presentation for feed controls, relieving said members however of the function of stops, and the shocks and jars incident thereto, by causing them to operate indirectly or to serve primarily as controls for an independent stop mechanism which in turn determines the effective operation of the ratchet feed mechanism.

What has been termed the normal feed step may or may not vary from the possible maximum. Moreover, in some cases it may be desirable to determine the positioning of the first staple for each blank section by a so-called normal instead of maximum feed-step occurring after the arbitrary feed step which a spacer block pin controls. This would be accomplished by so designing the spacer blocks that the pins carried thereby would in passing displace the cam-lever 85, said lever being released as soon as the pin passes (in other words the depending portions of the spacer blocks not functioning); hence the feed step occurring immediately after the arbitrary step controlled by the pin would be the normal feed step controlled by the regular functioning of the pawl-and-rack mechanism. This is stated merely in further explanation of the general principle involved, of positioning staples by an arbitrary or progressive-controlled feed step followed by a feed step independent of the progression. The term "regular" may conveniently designate either the maximum or normal feed steps, distinguished from the arbitrary feed step determined by the pattern mechanism.

To skip the staple forming and driving operation in the interval between successive box blanks, I provide an automatic staple wire cut-out which, while not interfering with the primary functions of the feed step controlling blocks, renders idle the operation of the staplers, between blanks, by depriving them of feeding wire. This mechanism is illustrated in Fig. 10. An upstanding bracket 140 suitably attached to any stationary part of the machine, as for instance the chain guides 6, is provided with a rocking crank arm 142, which is equipped with a detector finger 143 riding upon the sheet S. A spring, not shown, may be attached to arm 142 to press detector finger 143 down against the sheet S. The crank arm is further provided with a pin 144 which slides in a slot 145 in the depending plate 146 attached at 147 to the stapler head 19. The plate 146 is provided with a pin 148. The wire feed mechanism for feeding the staple stock wire comprises a shaft 149 which is intermittently rotated by means of the ratchet 150 engaged by the pawl 151 operated through the arm 152 from the eccentric strap 35 (Fig. 1). Loose upon the shaft 149 and adjacent the ratchet 150 is a cam 153 adapted to control the pawl 151 through the pin 154 extending therefrom. Affixed to the cam 153 is an arm 155 having affixed thereon an upstanding rigid switch plate 156. In operation, whenever the detector 143 drops into a space between box blanks, the plate 146 will be rocked by means of the pin 144 to the left, causing the pin 148 to engage under the switch plate 156 upon its downward stroke and to raise this plate upon its upward stroke, rocking the cam 153 and disengaging the staple wire feed pawl 151 from the ratchet. The pin 148 will continue its engagement under the switch plate 156 as long as the detector 143 remains in its lowered position in the space between blanks, so that no staples are formed or driven unless there is box blank material beneath the staples to be operated on. As soon as material to be operated on advances it raises the detector 143 which rides up on top of the material and is held in such position until another gap in the material presents itself. As the detector 143 is raised by the action of the passage of the box material the arm 142 swings the plate 146 carrying the pin 148 to the right (see Fig. 10) disengaging the pin 148 from the switch plate 156 thus permitting the pawl 151 to engage the ratchet 150 to resume the feed of staple wire. This prevents the feed of staple wire while the space between blanks is being carried under the staplers, and eliminates the formation and driving of staples without interfering with any of the other functions of the machine.

The operation may be briefly recapitulated: The sheets and cleats are assembled on the chains 30 by an operator who stands at the receiving end of the machine and lays the parts into the appropriate spaces defined by the spacer blocks, the block 132 being the first or leading block of each blank, block 127 being the last block for the blanks, and the blocks 115 being the intermediate blocks. By the intermittent movement of the conveyor, the work is passed under the staplers, binding wires being introduced and pulled along with it and the staples being formed and driven in the usual way. With reference to any blank, the leading block 132 for that blank causes the operation of the staplers arbitrarily at a point just a maximum feed step in advance of the desired position for the first staple of the blank. The next feed step, a maximum one, drives the first staple in the blank in the desired position. The cam surface 88 of the lever 85 then assumes control of the trigger 105 which by releasing the stop pawls 101 controls the backward stroke of the driving arm 46 of the chain operating ratchet wheel 130 and normal feed steps occur in succession until the depending portion 116 of the intermediate block 115 depresses the lever 85 and the pin 117 is substituted for the cam 88 of the lever 85 to cause an arbitrary feed step to locate the last staple in the section. After this arbitrary feed step the lever 85 continues to be depressed by the depending portion 116 of the block 115 and a maximum feed step follows to skip the space between sections and locate the first staple in the following section. This operation for each section of the blank is repeated until the pin 131 of the rear block 127 replaces cam 88 of the lever 85 to cause an arbitrary step to locate the last staple in the blank. After the blank has passed the staplers, the depending portion 130 of rear block 127 continues to depress the lever 85 and a maximum feed step follows and then one or more normal feed steps may follow to draw the intervening length of binding wire through the machine until the pin 138 on the forward extension of the block 132 again operates to locate a single stapling movement arbitrarily just a maximum feed step in advance of the first staple in the succeeding blank so that after the next step which is a maximum one the first staple of the next blank will be properly located.

It is clear that the number of feed steps between blanks depends on the distance between rear block 127 and leading block 132 and that said blocks may be located so closely together that no normal steps may occur between them though it is desirable in the manufacture of wirebound box blanks to provide sufficient binding wire at their ends to be twisted or otherwise joined to properly close the box. During the time the space between blanks is passing under the staplers the trigger 143 is depressed and the cam 153 is holding the staple wire feed pawl 151 away from the staple wire feed ratchet 150 so that no staple wire is fed to the staplers and their operation is thereby rendered ineffective.

I claim:

1. A machine for use in making wirebound boxes, comprising, in combination, means including fastener-setting mechanism for applying binding wire to box sections, means to cause relative progression between the work and said mechanism, adjustable means normally controlling the progression to locate fasteners at determined intervals, automatic means independently controlling the progression for definitely positioning fasteners in desired relation to the work, and manually operable means for independently changing the relation of the work to said mechanism.

2. A machine for use in making wirebound boxes, comprising, in combination, means including fastener-setting mechanism for applying binding wire to box sections, means to cause relative progression between the work and said mechanism, and means controlling the progression, and thereby controlling the placing of fasteners, comprising a variable stroke driver, stop mechanism including a pawl and rack one of which is connected with said driver, a trigger normally preventing coaction of the pawl and rack, and means for operating the trigger without rotating the same to permit interengagement of the pawl and rack to limit the stroke of said driver.

3. A machine for use in making wirebound boxes, comprising, in combination, means including fastener-setting mechanism for applying binding wire to box sections, means to cause relative progression between the work and said mechanism, and means controlling the progression, and thereby controlling the placing of fasteners, comprising a variable stroke driver, stop mechanism including a pawl and rack one of which is connected with said driver, a trigger normally preventing coaction of the pawl and rack, and independent means for operating said trigger without rotating the same to permit interengagement of the pawl and rack to limit the stroke of said driver, one of such means including successively presented members effecting such control of the progression as to definitely position fasteners.

4. A machine for use in making wirebound boxes, comprising, in combination, means including fastener-setting mechanism for applying binding wire to box sections, means to cause relative progression between the work and said mechanism, means normally controlling the progression to locate fasteners at determined intervals, and automatic means independently controlling the progression before the work is in position to receive a particular fastener, whereby subsequent normally controlled progression will definitely position such fastener.

5. A machine for use in making wirebound boxes, comprising, in combination, means including fastener-setting mechanism for applying continuous binding wire to materials for successive boxes, means spacing and determining the relation of the successive box materials, means to cause relative progression between the work and said mechanism, means normally controlling the progression to locate fasteners at determined intervals, means for definitely positioning the first fastener in the material for a box by arbitrarily controlling the progression in advance of the normally controlled progression to locate said fastener, and means preventing effective operation of the fastener-setting mechanism in the interval between the materials for successive boxes.

6. In a wirebound box blank machine, means for forwarding assembled sheets and cleats and continuous binding wire, mechanism for fastening the sheets, cleats and binding wire together, means for intermittently moving the work forwarding means, including a variable stroke member, adjustable means for limiting its stroke at predetermined points to cause fasteners to be placed at desired intervals in a box blank, and means temporarily incapacitating said last named means for definitely placing certain staples in desired relation to the blank.

7. In a wirebound box blank machine, means for forwarding assembled sheets and cleats of successive box sections and continuous binding wires, mechanism for fastening the sheets, cleats, and binding wire together, means for intermittently moving the work forwarding means, means normally controlling movements thereof for placing fasteners at desired intervals on the work, means occasionally superceding the normal control means for definitely positioning certain fasteners, means for spacing the last section for one box blank from the first section for a succeeding blank, and means for positioning the first fastener of said succeeding blank by arbitrarily controlling the movement of the work between the driving of said fastener and the last fastener of the preceding blank.

8. In a wirebound box blank machine, cooperating means for feeding assembled sheets and cleats for successive box blanks, supplying continuous binding wires and fastening the sheets, cleats and binding wire together at intervals, means to predetermine the normal feed movement of the machine, means for definitely positioning the fastener at the rear end of a blank, means for spacing the rear end of one blank from the forward end of the succeeding blank, and means for effecting an arbitrary feed step after the placing of the last fastener in the preceding blank, whereby the following feed step will place a fastener in desired position with respect to the forward edge of the next blank.

9. In a wirebound box blank machine, cooperating means for feeding assembled sheets and cleats for successive box blanks, supplying continuous binding wire, and fastening the sheets, cleats and binding wire together, means for spacing the rear end of one blank from the forward end of the succeeding blank, and means for effecting an arbitrary feed step after the placing of the last fastener in the preceding blank, whereby the following feed step will place a fastener in predetermined desired position with respect to the forward edge of the next blank, and means for preventing the fastener setting operation at the point determined by said arbitrary feed step.

10. In a wirebound box blank machine, means for feeding assembled sheets and cleats for successive box blanks and continuous binding wire, means for fastening the sheets, cleats and binding wire together, means determining normal feed steps, means for positioning the last fastener in the rear edge of a blank, and means for producing thereafter in succession an arbitrary feed step and a normal feed step including means for adjusting the relation between the normal feed step and the arbitrary feed step whereby the sum of said arbitrary and normal feed steps taken together after positioning said last fastener will locate a fastener at a predetermined desired point in the forward end of the next blank.

11. In a wirebound box blank machine, cooperating means for feeding assembled sheets and cleats for successive box blanks, supplying continuous binding wire and fastening the sheets, cleats and binding wire together, means normally determining feed steps, means for arbitrarily positioning a fastener in the rear end of a blank, and means for causing thereafter in succession an arbitrary feed step and a regular feed step, to position the next staple in desired position with respect to the forward end of the succeeding blank.

12. In a wirebound box blank machine, cooperating means for feeding assembled sheets and cleats for successive box blanks, supplying continuous binding wire and fastening the sheets, cleats and binding wire together, means for positioning a fastener in the rear edge of a blank, and means for causing a plurality of intervening feed steps between the rear edge of said blank and the forward edge of the succeeding blank and controlling at least one such intervening feed step, whereby the feed step following said intervening feed steps will position the first fastener of the succeeding blank.

13. In a wirebound box blank machine, cooperating means for feeding assembled sheets and cleats for successive box blanks, supplying continuous binding wire and fastening the sheets, cleats and binding wire together, means for positioning a fastener in the rear edge of a blank, and means for causing a plurality of intervening feed steps between the rear edge of said blank and the forward edge of the succeeding blank and controlling at least one such intervening feed step, whereby the feed step following said intervening feed steps will position the first fastener of the succeeding blank, and means for preventing the driving of staples at the points determined by said intervening feed steps.

14. In a wirebound box blank machine, cooperating means for feeding assembled sheets and cleats for successive box blanks, supplying continuous binding wire and for fastening the sheets, cleats and binding wire together, means for positioning a fastener in the rear edge of a blank, means for causing a plurality of intervening feed steps between said fastener and the first fastener of the succeeding blank, including means for varying certain of said intervening feed steps preceding the last step to control the location of said first fastener.

15. In a wirebound box blank machine, means for feeding assembled sheets and cleats for successive box blanks, mechanism for fastening the sheets and cleats together and continuous binding wire thereto, means for spacing successive box blanks from each other, and means for arbitrarily causing the fastening mechanism to operate at a predetermined point in advance of the forward ends of the successive box blanks whereby the next operation will position the first fastener in the succeeding blank, and means to nullify the effective operation of the fastening mechanism in advance of the forward ends of the successive box blanks.

16. In a machine for use in making wirebound boxes, work advancing means adapted to positively engage and advance the work through the machine, operating means therefor, a selective stop mechanism controlling said operating means, adjustable means for controlling said stop mechanism, and members definitely related to the work advancing means for temporarily incapacitating said adjustable means and assuming control of said stop mechanism.

17. In a machine for use in making wirebound boxes, fastener-setting mechanism, work-supporting means, feed mechanism, and feed regulating means including a stop plate having a plurality of stops, a reciprocating pawl-carrying slide, a trigger mounted in the slide adapted to normally maintain the pawls in said slide clear of the stops, a control member to periodically operate said trigger without rotating the same to release the pawls, and means related with the work adapted to temporarily incapacitate the control member.

18. In a machine for use in making wirebound boxes, fastener-setting mechanism, work-supporting means, feed mechanism, and feed regulating mechanism including a pawl and ratchet-teeth, a trigger withholding the pawl from said teeth, means normally controlling said trigger without rotating the same to permit interengagement of the pawl and teeth, and successively presented members related to the work adapted to supersede the normal controlling means.

19. A box blank machine comprising, in combination, means including fastener-setting mechanism for applying binding wires to sections of successive box blanks, means to space said sections and said blanks, means to cause relative progression between said mechanism and the work, means controlling the normal extent of said progression to determine the normal distance between fasteners, means definitely to locate the last fastener of one blank and the first fastener of the succeeding blank, said means being constructed and arranged to cause a plurality of regular feed steps and one arbitrary feed step between blanks, and means to interrupt the fastener-setting operation during said feed steps between blanks.

20. A machine for use in making boxes comprising, in combination, means including fastener setting mechanism for securing together the materials for successive box-blanks, means to space said materials, means to cause relative progression between said mechanism and the work, adjustable means to normally control the extent of said progression to locate fasteners at determined intervals in the work, means arranged to be automatically substituted for said normal controlling means to definitely locate certain fasteners in the work, and means controlled by the passage of the work through the machine and actuated by the fastener-setting mechanism to interrupt the fastener-setting operation at predetermined selected times during the operation of the machine.

21. A machine for making wirebound box blanks comprising fastener-setting mechanism for applying binding wires to sections of successive box blanks, and means to cause relative progression between the work and said mechanism, means controlled by said progression for locating the fasteners in the work, and means controlled by the work and actuated by the fastener-setting mechanism for interrupting said fastener-setting operation between blanks.

22. A machine for use in making wirebound boxes comprising, in combination, means including fastener-setting mechanism for applying binding wire to box sections, means to cause relative step-by-step progression between said mechanism and the work, means to cause arbitrary feed-steps to locate certain fasteners, and means to locate the first fastener in a blank by causing such an arbitrary feed-step in advance of a regular feed step.

23. A machine for use in making wirebound boxes comprising, in combination, means including fastener-setting mechanism for applying binding wires to box sections, feeding means to advance the work intermittently, means controlling said feeding means to cause normal feed-steps, means temporarily substituted for said controlling means to cause arbitrary feed-steps, and means for temporarily incapacitating both said normal and arbitrary feed controls to cause a full maximum feed-step.

24. A box blank machine comprising, in combination, staple forming and driving mechanisms for applying binding wires to successive box blanks, means for feeding staple wire to said mechanisms comprising feed rollers actuated by a ratchet and pawl drive and means controlled by the work for holding said pawl in engagement with said ratchet during the presence of work in the stapling plane and actuated by the driving mechanism for positively disengaging said pawl from said ratchet during the absence of work in the stapling plane.

25. A box blank machine comprising, in combination, fastener setting mechanism for applying binding wires to successive box blanks, means controlled by the work for rendering said mechanism effective during the presence of work in the operating plane and actuated by the fastener-setting mechanism for rendering said mechanism ineffective during the absence of such work.

26. A box blank machine comprising, in combination, means including fastener-setting mechanism for applying binding wires to successive box blanks, and means for rendering said mechanism inoperative in the absence of blank material to be operated on, said means being controlled by a detector which rides on the blank material and drops into gaps between box blanks and actuated by the fastener-setting mechanism.

27. A machine for use in making boxes comprising, in combination, means to position side material and cleats for a plurality of box sections with certain edges of the side material extending beyond certain cleat ends a distance approximately equal to the thickness of the side material, said positioning means being adjustable to accommodate side material of different thicknesses; mechanism to apply binding wire to said sections; and means to cause relative progression between said mechanism and the box sections.

28. A machine for use in making boxes comprising, in combination, means to position side material and cleats for a plurality of box sections in cooperative foldable relationship in such a maner that the sections of side material will overlap one another to form a tight corner when adjacent sections are folded at right angles to each other, said positioning means being adjustable to accommodate side material of different thicknesses; mechanism to apply binding wire to said sections; and means to cause relative progression between said mechanism and the box sections.

29. A machine for use in making boxes comprising, in combination, means to position side material and cleats for a box section with at least one edge of the side material extending beyond a cleat end a distance approximately equal to the thickness of the side material, said positioning means being adjustable to accommodate side material of different thicknesses; mechanism to apply binding wire to said sections; and means to cause relative progression between said mechanism and the work.

In testimony whereof, I have signed my name to this specification.

SERAPHINE F. BAUWENS.